United States Patent [19]

Mattheyses

[11] Patent Number: 5,060,147
[45] Date of Patent: Oct. 22, 1991

[54] STRING LENGTH DETERMINATION ON A DISTRIBUTED PROCESSING SYSTEM

[75] Inventor: Robert M. Mattheyses, Schenectady, N.Y.

[73] Assignee: General Electric Company, Schenectady, N.Y.

[21] Appl. No.: 397,632

[22] Filed: Aug. 22, 1989

Related U.S. Application Data

[63] Continuation of Ser. No. 44,633, May 1, 1987, abandoned.

[51] Int. Cl.$^5$ .................. G06F 15/80; G06F 15/66
[52] U.S. Cl. .................. 364/200; 364/231.9; 364/282.3; 364/258; 364/259
[58] Field of Search ... 364/200 MS File, 900 MS File, 364/736

[56] References Cited

U.S. PATENT DOCUMENTS

| | | | |
|---|---|---|---|
| 3,242,466 | 2/1960 | Dirks | 340/172.5 |
| 3,654,621 | 4/1972 | Bock et al. | 340/172.5 |
| 3,686,641 | 8/1972 | Logan et al. | 364/200 |
| 3,829,837 | 8/1974 | Farr, Jr. | 364/200 |
| 3,878,513 | 4/1975 | Werner | 364/200 |
| 4,180,854 | 12/1979 | Walden et al. | 364/200 |
| 4,236,227 | 11/1980 | Bull et al. | 365/49 |
| 4,425,617 | 1/1984 | Sherwood | 364/200 |
| 4,457,638 | 7/1984 | Horn et al. | 400/279 X |
| 4,464,732 | 8/1984 | Clark | 364/900 |
| 4,524,455 | 6/1985 | Holsztynski et al. | 364/200 X |
| 4,550,437 | 10/1985 | Kobayashi et al. | 364/200 |
| 4,575,798 | 3/1986 | Lindstrom et al. | 364/300 |
| 4,606,002 | 8/1986 | Waisman et al. | 364/200 |
| 4,611,280 | 9/1986 | Linderman | 364/300 |
| 4,620,274 | 10/1986 | Boothroyd et al. | 364/200 |
| 4,630,234 | 12/1986 | Holly | 364/900 |
| 4,633,431 | 12/1986 | Bar | 364/900 |
| 4,679,139 | 7/1987 | Durbin | 364/200 |
| 4,688,192 | 8/1987 | Yoshimura et al. | 364/900 |
| 4,709,327 | 11/1987 | Hillis et al. | 364/200 |
| 4,739,476 | 4/1988 | Fiduccia | 364/200 |
| 4,802,090 | 1/1989 | Mattheyses | 364/200 |

OTHER PUBLICATIONS

Hillis et al., "Data Parallel Algorithms", Comm. ACM, Dec. 1986, vol. 29, No. 12, pp. 1170–1183.
Vishkin, "Randomized Parallel Speedups for List Ranking", Journal Parallel & Distributed Computer, Jun. 1987, pp. 319–333.

Primary Examiner—Thomas C. Lee
Assistant Examiner—William M. Treat
Attorney, Agent, or Firm—Paul R. Webb, II; James C. Davis, Jr.

[57] ABSTRACT

A method for determining the length of data strings on a distributed processing system is disclosed. The method assigns a sequential position value to each element in the string, the position value zero being assigned to the true head element. The sequential position value of each element exceeds by one the sequential position value of the immediately succeeding element in the string. After identification of the tail element of the string, the sequential value of the tail element is incremented by one to yield the string length.

13 Claims, 10 Drawing Sheets

| COL 300 STRING ELEMENTS | COL 302 TEMPORARY POINTER 252 | COL 304 HEAD ELEMENT INDICATOR 254 | COL 306 SEQUENTIAL POSITION VALUE 256 | COL 308 TRUE HEAD POINTER 258 | COL 310 TAIL ELEMENT INDICATOR 260 |
|---|---|---|---|---|---|
| A0 | – | S | 0 | A0 | – |
| A1 | A0 | S | 1 | A0 | – |
| A2 | A0 | S | 2 | A0 | – |
| A3 | A1 | S | 3 | A0 | – |
| A4 | A0 | S | 4 | A0 | – |
| A5 | A1 | S | 5 | A0 | – |
| A6 | A2 | S | 6 | A0 | – |
| A7 | A3 | S | 7 | A0 | S |

FIG. 6f

STRING LENGTH DETERMINATION ON A DISTRIBUTED PROCESSING SYSTEM

This is a continuation of application Ser. No. 07/044,633, filed May 1, 1987, now abandoned.

The present invention is directed in general to methods for solving problems on a distributed processing system and, more specifically, to a method for manipulating data strings on a distributed processing system.

BACKGROUND OF THE INVENTION

Distributed processing system is used herein to describe a system in which a plurality of independent, interconnected, arithmetical-logical processor elements operate in parallel to perform a multiplicity of processing functions. The processors in the system are, typically, substantially identical to one another. The processors are preferably interconnected in a manner enabling communication between any pair of processors. In one type of parallel processing system known in the art as a single instruction multiple data (SIMD) system, a single sequence of instructions is provided to all processors. That is, all processors simultaneously perform operations in accordance with the same sequence of instructions. However, each processor may be performing the operations dictated by the instructions on different sets of data.

The individual processors of a SIMD parallel processing system typically have dedicated memory which may be loaded with data on which instructed operations can be performed. Also, each processor can read and write information at another processor. Thus, there is a flexibility in the operations performed by each processor insofar as derives from varying the data upon which each processor operates.

Various types of calculations are especially well suited for processing on a distributed processing system. Image processing problems represent one class of calculations that are well suited for and facilitated by processing on a distributed processing system. Frequently, calculations performed on a distributed processing system include manipulation of data strings. A data string as used herein is a sequence of data elements in which each string element is related to the next element in the string, for example by a pointer. It is frequently necessary in manipulating data strings to determine the length of each string. The length of a data string is the number of elements of which it is composed. Such length information is not immediately determinable since each string element only carries, by its pointer, the identity of an immediately succeeding element in the string, the latter element being closer to a true head element of the string.

Since distributed processing systems are often employed to process large amounts of data, such as in the case of image processing, it is always desirable to provide means for performing processing more quickly and efficiently. With respect to an operation such as string length determination, it is highly desirable to provide a method for performing the length determination as rapidly and as efficiently as possible. Such manipulations when performed on a distributed processing system offer the opportunity to enhance operating speed by performing operations in parallel on all string elements.

It is therefore a principal object of the present invention to provide an efficient method for the determination of data string lengths on a distributed processing system.

SUMMARY OF THE INVENTION

In accordance with the present invention, there is provided a method for determining the number of elements in a data string, i.e. the string length, on a distributed processing system. Each element comprises a first pointer identifying an immediately succeeding element in the string closer to a true head element thereof. The processing system comprises a plurality of processors intercoupled to communicate with one another. Each processor comprises processing means for performing arithmetic and logic functions and memory means for storing information. The processing system is responsive to a single sequence of instructions applied in parallel to all of the processors. Before commencing determination of the string length, each element of the string is stored in the memory means of a different one of the processors in the distributed processing system.

The method of the present invention assigns a sequential position value to each element in the string, the position value zero being assigned to the true head element. The sequential position value of each element exceeds by one the sequential position value of the immediately succeeding element in the string. The method also requires identification of the tail element of the string. Then, when the sequential position value of the tail element is incremented by one, the result is the number of elements in, i.e. the length of, the string.

The method commences with identifying a tail element of the string. The first pointer is then copied into a second pointer at each element. Next, at the true head element, a sequential position value is set to "0" and a head indicator is also set. Following this step, a counter value is set to "0". Next, it is determined if the head indicator is set at each element in the string. If it is not set at each element, a value of $2^i + v$ is taken as the sequential position value at each element for which the head indicator is not set. Each element taking the $2^i + v$ sequential position value is a receiving element, where:

$i$ = the current counter value; and $v$ = the sequential position value of a passing element identified by the second pointer of the receiving element.

Following this step, the head indicator value of each passing element is copied at the corresponding receiving element.

Next it is determined, at each element for which the head indicator is not set, what element is currently identified by the second pointer of the determining element and the second pointer value of the currently identified element is substituted for the second pointer of the determining element. The counter value is then incremented by one and the method returns to the step in which it is determined if the head indicator is set at each element in the string. For any performance of the latter step at which it is determined the head indicator is set at each element, i.e. at all elements, in the string, the method proceeds to a step in which the sequential position value of the tail element is incremented by one. The last recited incremented value is the number of elements in the string.

In an illustrated embodiment, a true head pointer identifying the true head element is provided at the true head element. Then, the value of the true head pointer is copied at each receiving element so that the tail element is ultimately provided with the pointer to the true head element. Upon determination of the string length, that value is transferred from the tail element to the true head element.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIGS. 6a, 6b, 6c, 6d, 6e and 6f illustrate the successive steps of determining the number of elements in the exemplary data string illustrated in FIG. 4 in accordance with an illustrated embodiment of the present invention.

DESCRIPTION OF THE INVENTION

Figure 1:
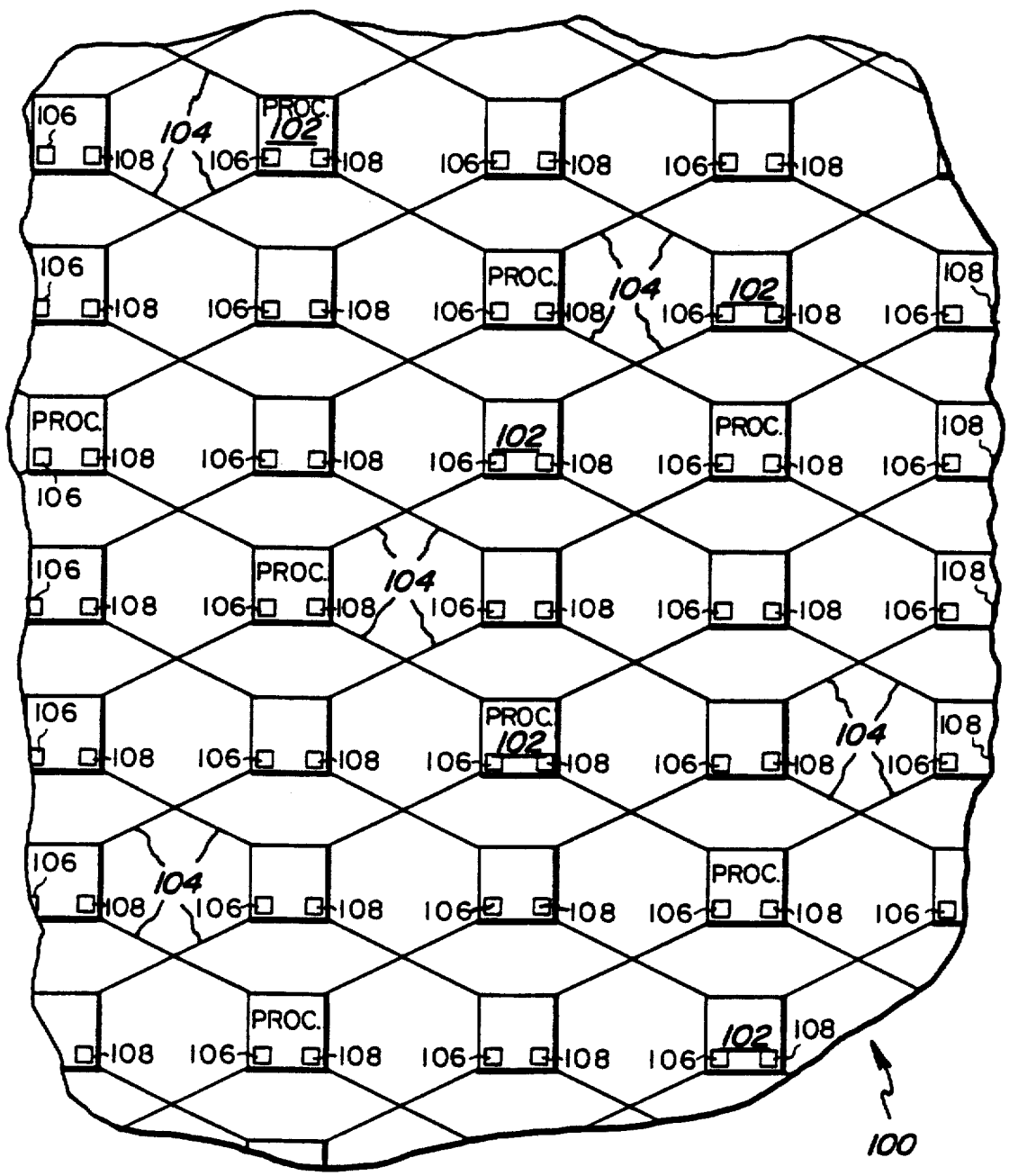
FIG. 1 illustrates an exemplary distributed processing system on which the method of the present invention may be practiced.

Referring now to the drawings, FIG. 1 illustrates an exemplary distributed processing system 100 on which the method of the present invention may be practiced. System 100 comprises a plurality of processors 102 which are locally interconnected through connections 104. Processors 102 are further interconnected by means of a communication network, not shown, that enables any processor 102 in system 100 to communicate with any other processor in the system. Communication between processors is used herein to refer to both the reading and writing by one processor of information at another processor. Such a communication network may simply comprise a cross bar network, well known in the art, in which every processor is connectable to every other processor through a controllable switch. More sophisticated communication networks such as self-routing networks, known in the art, may instead by used to enable more efficient communication between the processors. Each processor includes processing means 106, such as a microprocessor, for manipulating data to perform arithmetic and logic operations. Each processor further includes dedicated memory 108 which may be used, for example, for the storage of data upon which the processing means performs operations. Distributed processing systems of the type that may be used in practicing the method of the present invention are described in detail in "The Connection Machine" by W. D. Hillis, the MIT Press, 1985.

It is intended for the practice of the present invention that system 100 be of the SIMD type. That is, it is intended that a single set of instructions be applied in parallel to all processors 102 in system 100. The means by which programmed instructions are converted to a suitable coded form and applied in parallel to the elements of the distributed processing system are well known in the art and are therefore not described in detail herein.

Figure 2:
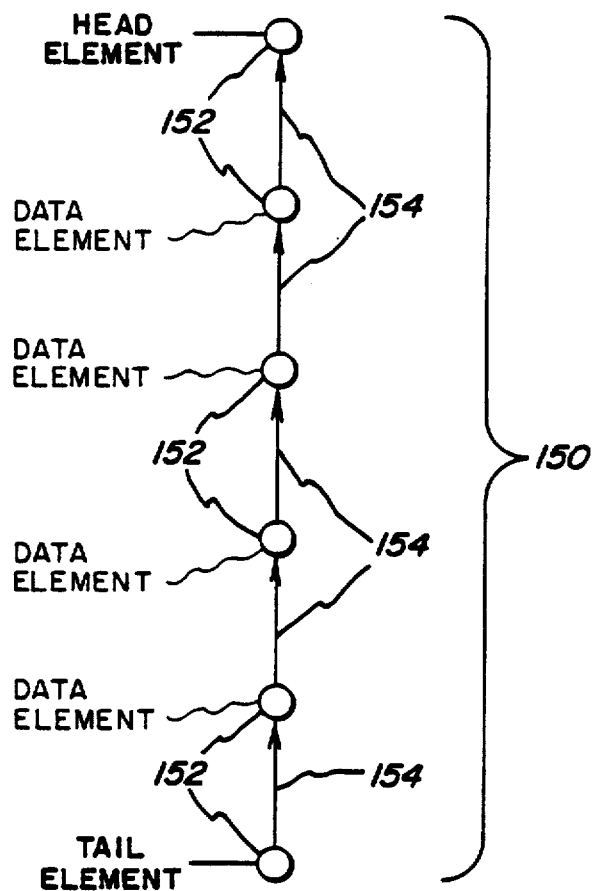
FIG. 2 illustrates an exemplary data string.

The present invention provides an efficient method for rapidly determining the length of, i.e. the number of elements in, a data string on a distributed processing system such as system 100. As described above, the string consists of a sequence of data elements each related to the next element in the string by a pointer. FIG. 2 provides a diagrammatic illustration of an exemplary data string 150 consisting of a plurality of exemplary string elements 152. Each element 152 includes a pointer 154 pointing to an immediately succeeding element in the string. All elements point toward a "head" of the string, and hence, away from a "tail" of the string. As a result, the element at the head of the string can be referred to as a head element and the element at the tail of the string can be referred to as a tail element.

Figure 3:
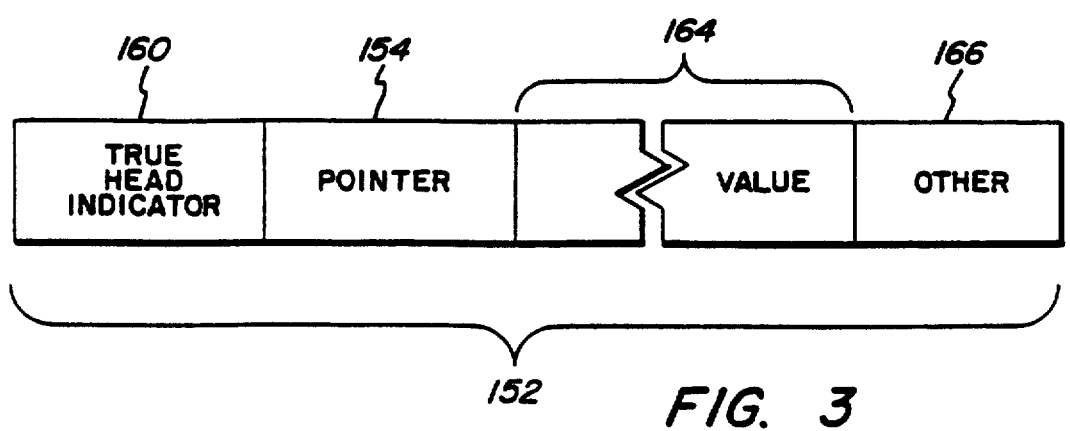
FIG. 3 illustrates an exemplary data element such as may be included in a data string.

FIG. 3 illustrates one of exemplary string elements 152. The element includes a true head indicator portion 160 which would indicate if the particular element is located at the true "head" of the string. The element further includes pointer 154, described for FIG. 2, which has a value effective to identify the next, immediately succeeding element in the string closer to the head of the string. It is preferred herein to store the respective elements of the data string in the respective dedicated memories of processors 102, with one string element allocated to a single processor memory, and hence to a single processor. The number of processors in system 100 must therefore be greater than or equal to the number of elements in the string so stored. Each pointer 154 may simply contain the identity of the processor in whose memory the next, immediately succeeding element in the string is stored. It is therefore a property of the data string that each element carries only the identity of the next element in the string and no other element identities.

A value field 164 contains the substantive data of element 152. Value field 164 may be of any size depending on the nature of the data being carried by the string. For example, in the case of image processing data, the value field of each string element may hold pixel color or gray shade data. The element may further include other fields of information, collectively indicated at 166, which derive from the nature of the substantive data carried in the string.

Figure 4:
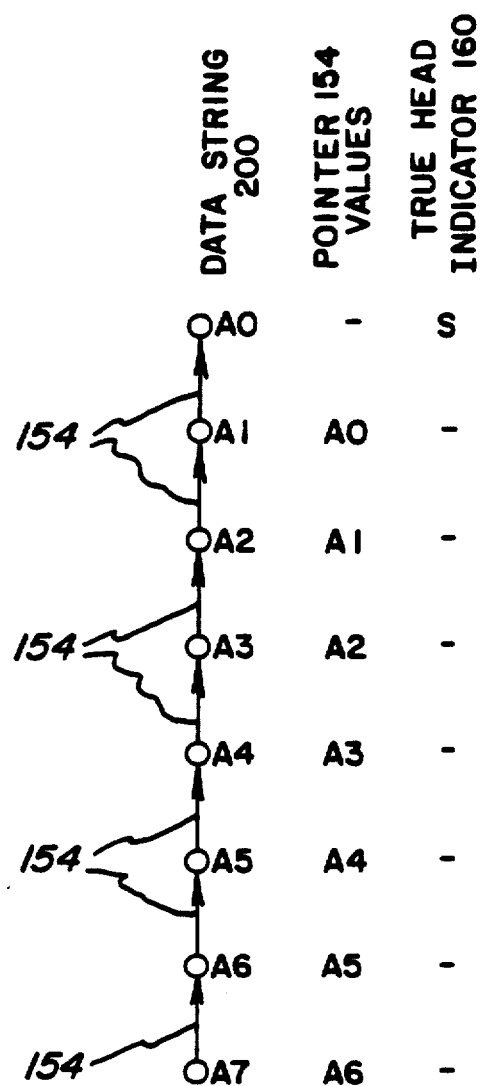
FIG. 4 illustrates another exemplary data string including for each element a portion of the data element structure illustrated in FIG. 3.

FIG. 4 illustrates an exemplary data string 200 the length of which is determined in an illustrated embodiment of the present invention described hereinbelow. String 200 consists of eight elements respectively labelled A0 through A7 for reference purposes. Pointers 154 are diagrammatically shown to connect the elements, the direction of each arrow indicating that each element only carries the identity of the immediately succeeding element in the string. The values of pointer 154 and true head indicator 160 are listed adjacent each element of string 200. The true head indicator is indicated as set, by an "S", only for element A0, which is the true head element of string 200. The pointer value for each element is simply the identity of the immediately succeeding element in the string. The pointer value for element A0 is blank since there is no element that succeeds it.

It is reiterated that since each element only carries the identity of the immediately succeeding element, the number of elements in the string is not immediately determinable. Further, in actual practice such as where data strings comprise image data requiring processing, each string may be of substantial length, e.g. on the order of hundreds of elements. These significant lengths encountered in actual practice further complicate the length determining task and potentially make it more time consuming.

Figure 5:
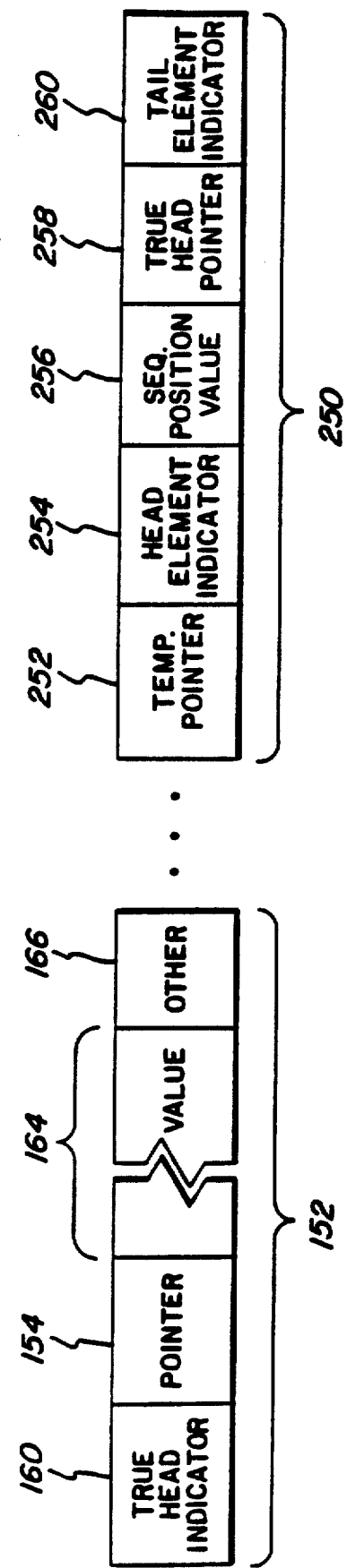
FIG. 5 illustrates a data structure, for a data element, preferred for the practice of the method of the present invention.

In practicing the present method on a distributed processing system, it is preferred herein to maintain undisturbed the information originally comprising each string segment, i.e. element 152 as illustrated in FIG. 3 and described hereinabove. To achieve this end, an additional data structure is constructed for each string element. This additional data structure "shadows" or "parallels" the original element structure. The content of the additional structure is both created and changed in accordance with the method of the present invention. FIG. 5 illustrates both the original string element structure shown in FIG. 3 and an additional data structure 250 which parallels original element 152. Structure 250 includes a temporary pointer 252 for carrying an element identity determined by the inventive method. Structure 250 further includes a head element indicator 254 which when set, indicates that the element it is associated with is the head element of a new string created, temporarily, by the method of the present invention. The additional data structure also includes a sequential position value field 256, the value of which is computed for each element by the inventive method. The sequential position value for each element is that element's sequential position in the string. Data structure 250 further includes a true head pointer 258 for carrying the identity of the true head element. Initially, this field is blank for all elements. Data structure 250 additionally includes a tail element indicator 260 which when set at an element indicates that the element is at the tail of the string. Indicator 260 is initially unset, since the tail element does not initially carry information identifying its position at the tail of the string. The method, in the course of performance, may require one or the other of indicators 254 or 260 to be set. The status as to whether indicators 160, 254 or 260 are unset or set is determined by whether the indicator carries a first or a second predetermined bit value. For example, the unset or set condition may be respectively indicated by the presence of a "0" or "1" bit.

As stated above, each string element is stored in the memory of a different processor of the distributed processing system. Before proceeding with the method of the present invention, it is first necessary to create in the respective processor memories, the additional data structure 250 for each element. It is preferred that each data structure 250 be created in the same processor memory as its corresponding string element. It is further preferred that the information comprising string elements 152 and data structures 250 be aligned in the respective processor memories. That is, each portion of element 152 and structure 250 is at the same memory address location in every processor memory. Such alignment in memory is necessary because of the SIMD format preferred herein. As a result, a single instruction applied to all processors can initiate an operation by each processor on the data at the same memory address location.

In essence, the method of the present invention assigns a sequential position value to each element in the string. The position value zero is assigned to the true head element. The sequential position value of each element exceeds by one the sequential position value of the immediately succeeding element, as identified by pointer 154. The method also requires identification of the tail element of the string. Then, when the sequential position value of the tail element is incremented by one, the result is the number of elements in, i.e. the length of, the string.

Figure 6A:
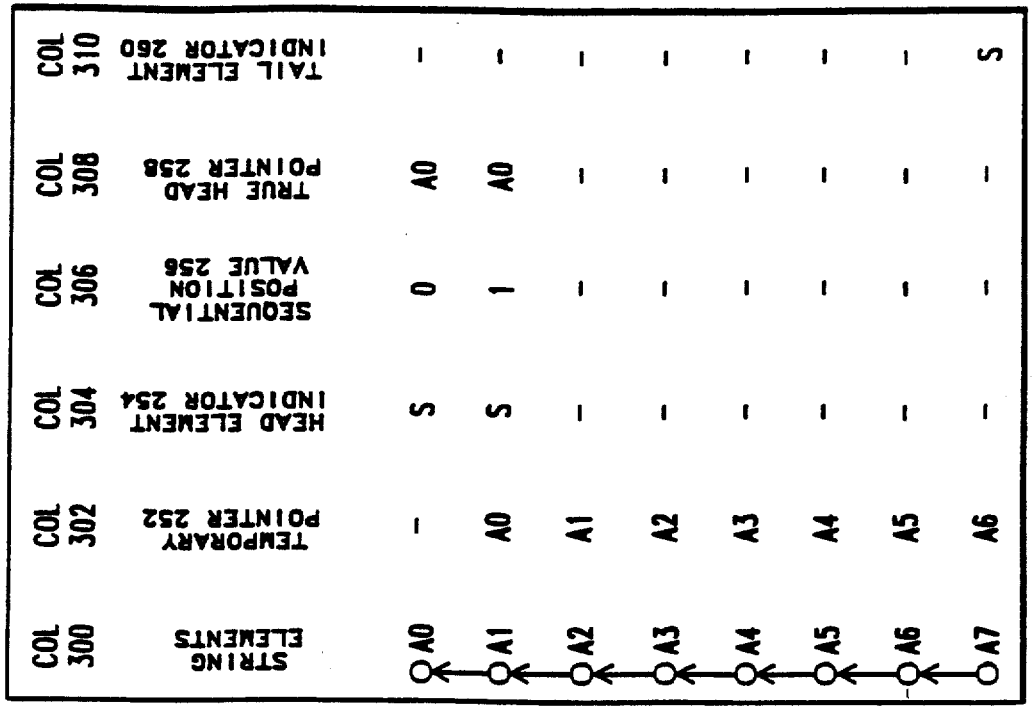
Figure 6B:
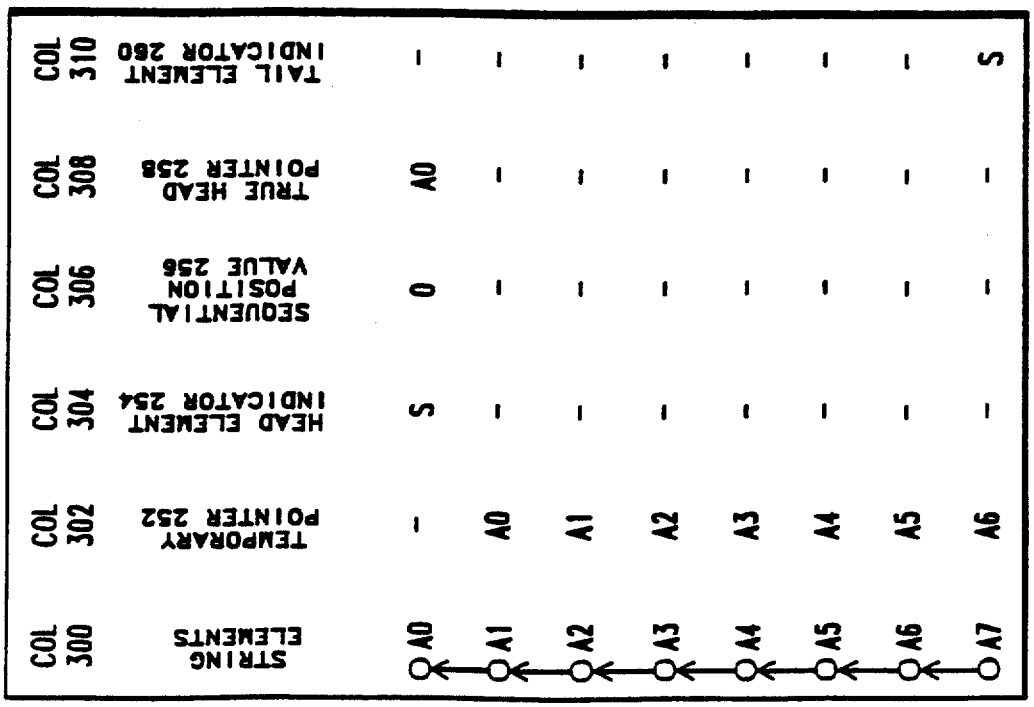
Figure 6D:
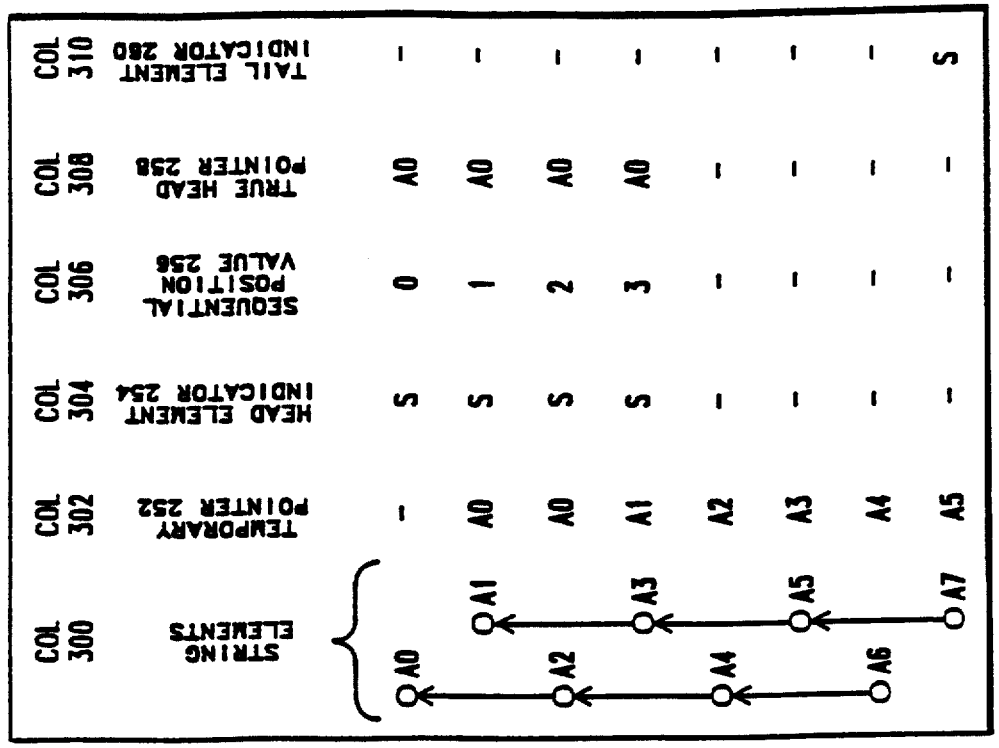
Figure 6C:
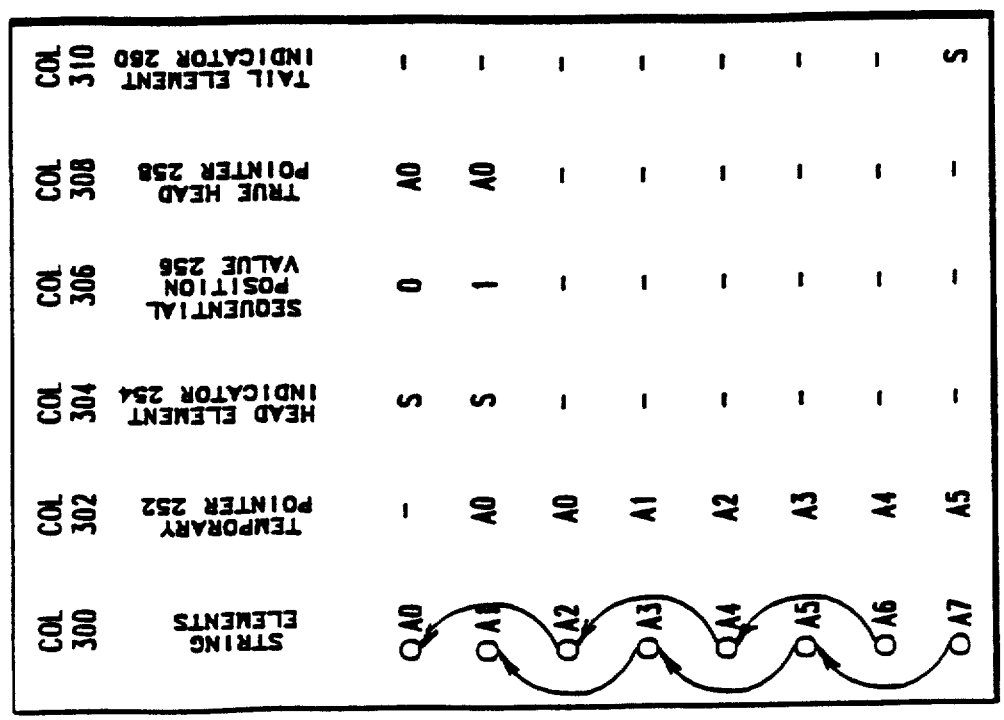
Figure 6E:
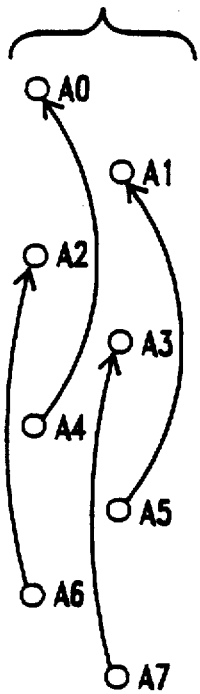
Figure 7:
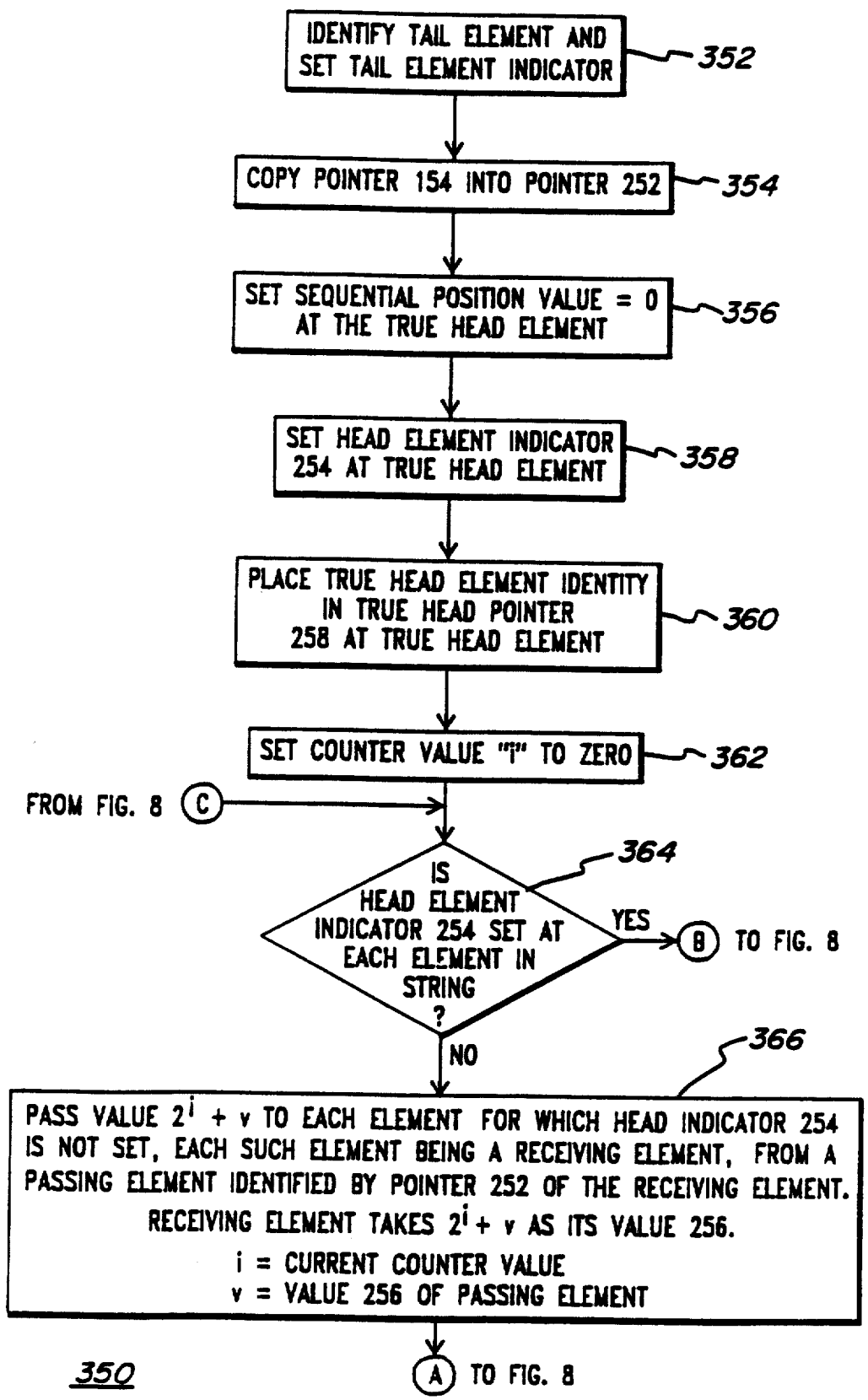
FIGS. 7 and 8 present the illustrated embodiment of the present invention in flowchart form.
Figure 8:
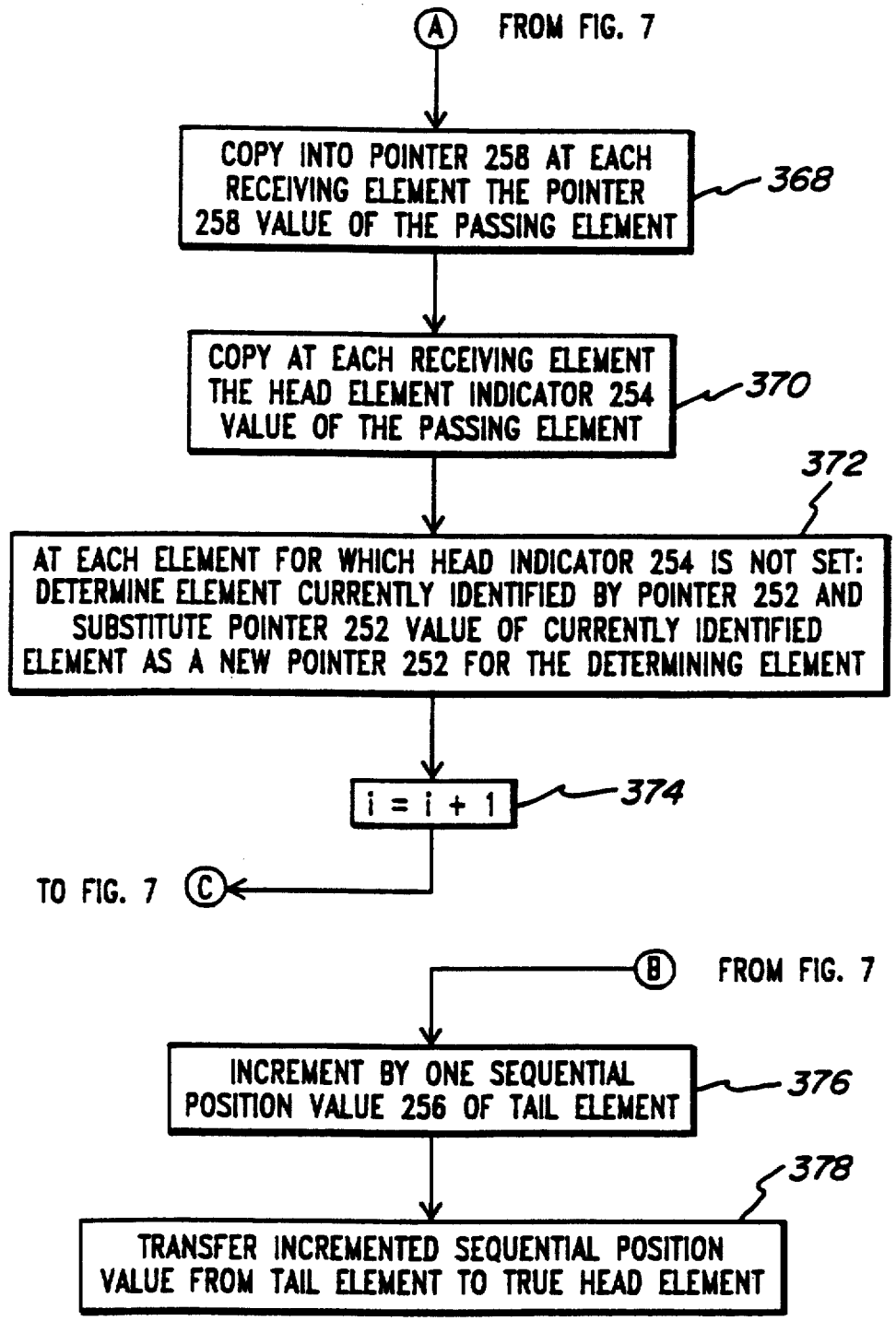

An illustrative embodiment of the method of the present invention is shown in FIGS. 6a-6f, 7 and 8. FIGS. 6a, 6b, 6c, 6d, 6e and 6f illustrate the successive steps in determining the number of elements in string 200 in accordance with the method of the present invention. FIGS. 7 and 8 present the method in flowchart form. Referring to FIG. 6a, a column 300 contains the elements of string 200. The five columns adjacent string 200 are allocated to indicate the information carried in data structure 250 for each string element. Thus, columns 302, 304, 306, 308 and 310 are respectively allocated to indicate temporary pointer 252, head element indicator 254, sequential position indicator 256, true head pointer 258 and tail element indicator 260. FIGS. 6b through 6f have the same column structure. In each FIGS. 6a-6f, the temporary pointers listed in column 302 are generally also diagrammatically shown in column 300 as connecting the elements.

Referring to FIG. 7, the illustrated embodiment of the string length determination method, shown in a flowchart 350, commences with a step 352 in which the element at the tail of the string is identified and tail element indicator 260 is set at the tail element. One method for identifying the tail element is to have each processor, in the distributed processing system, that carries a string element in its memory, set a bit (i.e. a write operation) at a predetermined address location in the memory of the processor carrying the immediately succeeding element in the string. The tail element will be the only element for which this bit is not set and will thereby be identified.

Next, at step 354, the value of pointer 154 is copied into pointer 252 at all elements in the string. Then, at the true head element, i.e. the only element having true head indicator 160 set, sequential position value 256 is set to "0" (step 356) and head element indicator 254 is set (step 358). Additionally, at the true head element, in step 360, that element's identity is inserted as the value of true head pointer 258. As noted above, the values of pointers 154, 252 and 258 may simply be the identity of the processor whose memory stores the string element intended to be identified by the pointer.

As described above, it is preferred herein that the method of the present invention be practiced on a SIMD type distributed processing system. In such a case, each step of the method is performed by applying the same instruction to all processors in the system. For example, in order to execute step 354, each processor would be instructed to copy the information stored at the memory address location corresponding to pointer 154 into the memory address location corresponding to pointer 252. Note however that at subsequent steps only certain elements actually carry out the provided instruction depending on the determination of a condition. For example, while instructions corresponding to steps 356, 358 and 360 are applied to all processors, these steps are only performed at the processor that determines true head indicator 160 is set.

The performance of steps 352 through 360 are illustrated in FIG. 6a. An "S" in column 310 for element A7 indicates that the tail element indicator has been set for element A7 (step 352). Column 302 carries the pointer 252 element identities that are copied from pointer 154

(step 354). Thus in FIG. 6a, pointer 252 for each element identifies the immediately succeeding element in the string. For element A0, the true head element, the sequential position value is indicated as "0" in column 306 (step 356) and an "S" in column 304 indicates head indicator 254 is set (step 358). Element identity A0 is placed in column 308 for element A0 as true head pointer 258 (step 360).

Referring again to FIG. 7, flowchart 350 continues with step 362 in which a counter value "i" is set to "0". The current value of the counter is preferably maintained by all processors carrying string elements. Next, at step 364, a determination is made whether head indicator 254 is set at each string element, i.e. at all elements in the string. If it is not set at all elements, the method proceeds to step 366 in which a computed value is passed to each element in the string for which head indicator 254 is not set, each such element being hereinafter referred to as a receiving element. The computed value which is passed is equal to $2^i + v$ where i is the current value of the counter and v is the sequential position value of a passing element identified by pointer 252 of the receiving element. The receiving element takes the computed value of $2^i + v$ as its sequential position value 256. Referring to FIG. 8 in which flowchart 350 is continued, the value of true head pointer 258 is copied from the passing element to the receiving element, as the receiving element's pointer 258 (step 368). Further, at step 370, the value of head element indicator 254 is copied from the passing element to the receiving element, as the latter element's indicator 254.

At the commencement of step 366, the status of the string elements is as shown in FIG. 6a. With respect to step 366, head indicator 254 is not set at elements A1 through A7 and these elements are therefore receiving elements. The passing element corresponding to each receiving element is identified by pointer 252 of the latter element. Thus, for receiving elements A1, A2, A3, A4, A5, A6 and A7, the passing elements are respectively elements A0, A1, A2, A3, A4, A5 and A6. As can be seen, an element may be both a passing and receiving element. Element A1 as a receiving element is considered. For computing $2^i + v$, the current value of i is "0" and v is equal to the sequential position value of element A0 which is "0". Therefore, $2^i + v = 1$. Also for element A1, in performing step 368 the true head pointer 258 value A0 is copied from element A0. For step 370, the set condition of head indicator 254 at element A0 is copied at element A1. Sequential position values 256 and true head pointers 258 of elements A1 through A6 are undetermined prior to commencing step 366. As a result, the computed $2^i + v$ sequential position value (step 366) and copied pointer 258 (step 368), for the receiving elements A2 through A7 that respectively correspond to passing elements A1 through A6, are not determinable. With respect to step 370 for each of these receiving elements (A2 through A7), head indicator 254 is unset at the corresponding passing element and so an unset condition is copied.

The results of performing steps 366 through 370 are illustrated in FIG. 6b and so, for elements A2 through A7, blanks are shown in columns 306 and 308 to indicate the nondeterminable values of position value 256 and pointer 258. The blanks in column 304 for these elements indicate the unset condition of head indicator 254 for each of these elements. With respect to element A1, the computed value of $2^i + v$ is shown in column 306. To show performance of step 368, A0 appears as the value for true head pointer 258 for element A1. In accordance with step 370, an "S" appears in column 304 for element A1 to show the head indicator is set for that element.

With respect to steps 366, 368 and 370, the terms "passing" and "receiving" are chosen to facilitate the description of step performance. It is important, however, to note that at the commencement of step 366, while the identity of each passing element is known at each receiving element via pointer 252, the reverse is not true. As a result, step 366 is performed by each element first determining if it is a receiving element on the basis of whether its head indicator is set. Then, each receiving element, by its pointer 252 identifies it corresponding passing element and can read the appropriate information from that passing element. The computation of $2^i + v$ is preferably performed by the processor associated with the receiving element though the computation could be performed by the passing element processor. Where the computation is performed by the receiving element processor, the value of "v" would of course have to be read from the passing element to enable the computation. In order to perform the computation at the passing element processor, the passing element processor would first have to be apprised that it carries a passing element. This could be accomplished by the receiving element processor writing both a flag indicator and the receiving element identity into the passing element processor. The computation result at the passing element processor could either be read and copied by the receiving element processor or written into the latter processor by the passing element processor.

Referring again to FIG. 8, the illustrated method continues with step 372 wherein each element for which head indicator 254 is not set, substitutes as a new value for its pointer 252, the pointer 252 value of the element currently identified by its pointer 252. The result of performing step 372 is illustrated in FIG. 6c, so that prior to performance of that step, pointer values 252 and head indicators 254 are as illustrated in FIG. 6b. As can be seen, step 372 is performed for elements A2 through A7 since head indicator 254 is not set for these elements. As an example, consider element A4, pointer 252 of which currently identifies element A3. Pointer 252 of currently identified element A3 is element A2. Element A4 therefore substitutes for its pointer 252 the new value A2. A2 therefore appears in column 302 for element A4 in FIG. 6c. The effect of step 372 is to divide the string as defined by pointers 252 before the step, into two strings as defined by pointers 252, at elements for which head indicator 254 is not set, after the step. The pointer 252 values resulting from step 372, at the elements for which head indicator 254 is not set, are also diagrammatically illustrated in column 300 of FIG. 6c. Since steps 366-372 are performed only for elements for which head indicator 254 is not set, the pointer 252 value at each element for which that head indicator is set is not of significance in the next performance of each of these steps and is therefore not diagrammatically shown. Note that since the element 152 structure is unaffected by the method of the present invention, pointers 154 and hence the original string structure remain unchanged.

Flowchart 350 (FIG. 8) continues with step 374 in which the counter value "i" is incremented from "0" to "1". The method then returns to step 364 (FIG. 7) at which the determination is again made whether head indicator 254 is set at all string elements. In the illustrated example, it is clear in FIG. 6c that the head indicator is not set at all elements in the string, i.e. it is not set at elements A2 through A7. Therefore the method proceeds to a second performance of steps 366, 368 and 370. At the commencement of step 366, head indicator 254 is not set for elements A2 through A7, as indicated in FIG. 6c. Pointers 252 of element A2 and A3 respectively identify elements A0 and A1. As a result, element A2 and A3 are respectively "receiving" elements for "passing" elements A0 and A1. For element A2, $2^i+v=2$ where $i=1$ and $v=0$. For element A3, $2^i+v=3$ where $i=1$ and $v=1$. For receiving elements A4 through A7, the respective passing elements A2 through A5 carry nondeterminable values of position value 254 at the commencement of step 366. As a result, a nondeterminable result is computed in performing step 366 for elements A4 through A7. The results of performing step 366 are illustrated in FIG. 6d wherein the computed values are indicated in column 306 for elements A2 and A3 and blanks are indicated for elements A4 through A7. Following completion of step 366, the method proceeds to steps 368 and 370, the results of these steps also being indicated in FIG. 6d. Note that in column 300 of FIG. 6d, the two strings diagrammatically illustrated in FIG. 6c have been drawn distinct from one another to more clearly illustrate their respective structures.

Following the second performance of step 370, step 372 is reached and is performed for elements A4 through A7 for which head indicator 254 is not set. Thus, each of these elements copies the pointer 252 value of the element currently identified by its pointer 252. The result of this second performance of step 372 is illustrated in FIG. 6e, while the values of pointers 252 and head indicators 254 at the commencement of that step are illustrated in FIG. 6d. As an example, the performance of step 372 for element A5 is considered. At the commencement of step 372, element A3 is currently identified by pointer 252 of element A5. Pointer 252 of element A3 identifies element A1 (FIG. 6d). Thus, performance of step 372 results in A1 being substituted as the new value for pointer 252 of element A5, this being indicated in FIG. 6e. Column 300 in FIG. 6e diagrammatically illustrates the pointer 252 values, determined as a result of this second performance of step 372, at elements for which head indicator 254 is not set. It is again noted that the effect of step 372 is to divide each string as defined by these pointers 252 before the step, into two strings as defined by these pointers 252 after the step. Therefore, the second performance of step 252 results in a total of four strings being defined by pointers 252 at elements for which head indicator 254 is not set.

Following this second performance of step 372, step 374 is performed in which the counter is incremented from "1" to "2". The method then returns to step 364 where it is determined that head indicator 254 is not set at all string elements, since it is not set at elements A4 through A7 (FIG. 6e). Therefore, the method proceeds to a third performance of steps 366, 368 and 370. At the commencement of step 366, the head indicator of elements A4, A5, A6 and A7 are not set, as indicated in FIG. 6e. Pointers 252 of "receiving" elements A4, A5, A6 and A7 respectively identify "passing" elements A0, A1, A2 and A3. As a result, elements A4, A5, A6 and A7 are respectively the "receiving" elements for "passing" elements A0, A1, A2 and A3. The computation of $2^i+v$ is performed for each "receiving" element in the manner described above. For example, with respect to element A6, the current counter value is 2, the sequential position value of the corresponding passing element A2 is 2 and $2^i+v=6$. This computed value is indicated, for element A6, in column 306 of FIG. 6f which illustrates the results of the third performance of step 366, as well as steps 368 and 370. In column 300 of FIG. 6f, the strings diagrammatically illustrated in FIG. 6e are drawn in a manner more clearly illustrating their respective structures.

Referring again to FIG. 8, following completion of step 370, step 372 is reached. However, at this point, head indicator 254 is set at all elements so that this step is not performed. The method therefore proceeds to step 374 where the counter is incremented and then returns to step 364 (FIG. 7). At step 364, it is determined that head indicator 254 is set at each element in the string (FIG. 6f) and the method therefore proceeds to step 376 (FIG. 8). At step 376, the sequential position value of the tail element is incremented by "1". Since, as seen in FIG. 6f, the sequential position value of element A7 is seven, the incremented value is eight. The incremented value is equal to the number of elements in, i.e. the length of, the data string. It is preferred herein that the string length be transferred to the true head element of the string. Pointer 258 of the tail element identifies the true head element and the tail element is thereby enabled to transfer the string length to the true head element, e.g. by a write operation.

While, in the illustrated embodiment, step 372 is performed only at elements for which head indicator 254 is not set, the invention is not so limited. That step may instead be performed by each receiving element defined at the immediately preceding performance of step 366. It would then be necessary to identify the receiving elements, e.g. by setting an indicator, since their respective identities as such may otherwise be lost upon the setting of head indicators at step 370. With respect to the string length determination, the length determination result is unaffected by performing step 366 with receiving elements.

While the illustrated embodiment of the present invention comprises a plurality of method steps presented in a sequence, the invention is not so limited. Some steps may be performed in parallel with others where such steps do not depend on the results of performing previous steps. For example, steps 356, 358 and 360, all of which are performed for the true head element, can be performed simultaneously. Similarly, once the receiving element(s) are identified, steps 366, 368 and 370 can be performed simultaneously. Note further, where such steps can be performed in parallel, if it is instead desired to perform them sequentially, they need not be performed in the sequence illustrated and described hereinabove.

While an illustrated embodiment of the present invention has been described in which the length of a single data string is determined on a distributed processing system, the invention is not so limited. The respective lengths of a plurality of data strings may be simultaneously determined by the method of the present invention. This is simply accomplished by storing the plurality of data strings in the processors of the distributed processing system with one string element allocated to each processor. Since the same sequence of instructions is applied to all processors, the length determination will be simultaneously performed for all of the stored data strings.

In the practice of the present invention as described hereinabove, the number of processors in the distributed processing system is greater than or equal to the number of elements in the data string the length of which is being determined. The invention is, however, not so limited. It will be apparent to those skilled in the art that by appropriately storing more than one string element at predetermined address locations in the memory of each processor, string length determination may be performed on strings composed of a number of elements greater than the number of processors.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method of operating a data processing system to determine a length of a data string comprising a plurality of sequential data elements, said method comprising the steps of:
   a) assigning each element a pointer identifying an immediately succeeding element in said string which is closer to a true head element of said string;
   b) processing the string of data elements to identify a tail element of said string;
   c) forming in the processing system for each data element a corresponding data structure having a second pointer, a head indicator, a sequential position value, a true head pointer and a tail element indicator;
   d) copying said first pointer into the second pointer at each said element;
   e) setting the sequential position value of the data structure corresponding to the true head element to zero;
   f) setting the head indicator at the data structure corresponding to said true head element;
   g) initializing a counter in the processing system to a value of zero;
   h) determining if said head indicator is set in the data structure corresponding to each said element in said string and, if so, proceeding to step n) and, if not, proceeding to step i);
   i) assigning a value of $2^i + v$ as the sequential position value of each said data structure for which said head indicator is not set, each of the last recited elements being a receiving element, where:
   i = a current counter value; and
   v = a sequential position value of a passing element identified by said second pointer of said data structure;
   j) copying at the data structure corresponding to each said receiving element the head indicator of said passing element;
   k) determining, at each said element for which said head indicator is not set, the element currently identified by said second pointer of the corresponding data structure and substituting said second pointer of said currently identified element for said second pointer of said determining element;
   l) incrementing by one said counter value;
   m) repeating steps h) through l) until all head indicators are set;
   n) incrementing by one said sequential position value of the data structure corresponding to the tail element, the last recited incremented value being the number of said elements in said string, the number of elements being the length of the string; and
   o) using the length information derived on step n) to manipulate the data elements and perform calculations in the data processing system.

2. The method of claim 1 further including the step, following step (i), of:
   copying at the data structure corresponding to each said receiving element said true head pointer from the corresponding passing element; and
   following step (n),
   transferring said last recited incremented value from said tail element to said true head element.

3. A method of operating a distributing processing system to determine a length of a string of data elements, said processing system comprising a plurality of processors intercoupled to communicate with one another, each said processor comprising processing means for performing arithmetic and logic functions and memory means for storing information, said processing system being responsive to a single sequence of instructions applied in parallel to all of said processors for simultaneously processing in parallel in different ones of said processors said data elements, said method being performed in each processor and comprising the steps of:
   a) assigning each said element a first pointer identifying an immediately succeeding element in said string closer to a true head element thereof;
   b) storing each said element of said string in the memory means of a different one of said processors;
   c) operating the processors to identify a tail element of said string;
   d) copying said first pointer of each said element into a second pointer of a data structure stored in the memory means of the associated processor;
   e) assigning at said true head element a sequential position value of a corresponding data structure to zero;
   f) setting a head indicator at said true head element;
   g) initializing a counter value at a value of zero;
   h) determining if said head indicator is set at each said element in said string and, if so, proceeding to step n) and, if not, proceeding to step i);
   i) assigning a value of $2^i + v$ as the sequential position value at each said element for which said head indicator is not set, each of the last recited elements being a received element, where:
   i = a current counter value; and
   v = a sequential position value of a passing element identified by said second pointer of said receiving element;
   j) copying at each said receiving element the head indicator of said passing element;
   k) determining, at each said element for which said head indicator is not set, the element currently identified by said second pointer of said determining element and substituting said second pointer of said currently identified element for said second pointer of said determining element;
   l) incrementing by one said counter value;
   m) repeating steps h) through l) until all head indicators are set;
   n) incrementing by one said sequential position value of said tail element, the last recited incremented value being the number of elements in said string, said number comprising the length of the string; and o) using such number to manipulate the data elements and perform calculations in the distributed processing system.

4. The method of claim 3 wherein the values of said first and said second pointers each identify the processor in whose memory means the string element identified by said first or said second pointer is stored.

5. The method of claim 3 wherein said elements of said string are aligned in the respective memory means of said processors such that information comprising each said element is stored at the same address location.

6. The method of claim 3 wherein a true head pointer identifying said true head element is provided at said true head element, said method further including the step, following the step (i), of copying at each said receiving element, from the passing element, said true head pointer; and said method additionally including the step, following step (o), of:

transferring said last recited incremented value from said tail element to said true head element.

7. Distributing processing apparatus for processing a string of data elements, said apparatus comprising:

a) means for assigning each said element a first pointer identifying an immediately succeeding element in said string which is closer to a true head element of the string;

b) means for identifying a tail element of said string;

c) means for copying said first pointer into a second pointer of a data structure corresponding to said element;

d) means for assigning a sequential position value of the data structure corresponding to said true head element a value of zero;

e) means for setting a head indicator at said true head element;

f) a counter having an initial value of zero;

g) first means for determining if said head indicator is set at each said element in said string;

h) means responsive to the first determining means determining that the head indicator is not set at all elements for assigning a value $2^i + v$ as the sequential position value at each said element for which said head indicator is not set, each of the last recited elements being a receiving element, where:

i = a current counter value; and v = a sequential position value of a passing element identified by said pointer of said receiving element;

i) means for copying at each said receiving element the head indicator of said passing element;

j) second means for determining, at each said element for which said head indicator is not set, the element currently identified by said second pointer of such element and for substituting said second pointer of said currently identified element for said second pointer of said determining element;

k) means for incrementing by one said counter value;

l) means responsive to the second determining means determining that the head indicator is set at all elements for incrementing by one said sequential position value of said tail element, the last recited incremented value being the number of said elements in said string and denoting the length of the string;

m) memory means for storing data; and n) processing means for manipulating the stored data in response to the length of a string.

8. The apparatus of claim 7, wherein the data structure corresponding to the true head element has a true head pointer identifying said true head element, and said distributed processing means further comprises:

means for copying at each said receiving element, from the passing element identified by the receiver element, said true head pointer; and means for transferring said last recited incremented value from said tail element to said true head element.

9. Distributed processing apparatus for processing a string of data elements, said processing apparatus comprising a plurality of processors intercoupled to communicate with one another, each said processor comprising processing means for performing arithmetic and logic functions and memory means for storing information, said processing system being responsive to a single sequence of instructions applied in parallel to all of said processors;

a) means for assigning each said element a first pointer identifying an immediately succeeding element in said string which is closer to a true head element of the string;

b) means for storing each said element of said string in the memory means of a different one of said processors, each processor including:

c) means for identifying a tail element of said string;

d) means for copying said first pointer into a second pointer of a data structure stored in the memory means of the processor:

e) means for assigning a sequential position value of zero at the data structure associated with the true head;

f) means for setting a head indicator at said true head element;

g) a counter having an initial value of zero;

h) first means for determining if said head indicator is set at each said element in said string;

i) means responsive to the first determining means for assigning a value $2^i + v$ as the sequential position value at each said element for which said head indicator is not set, each of the last recited elements being a receiving element, where:

i = a current counter value; and v = a sequential position value of a passing element identified by said second pointer of said receiving element;

j) means for copying at each said receiving element the head indicator of said passing element;

k) second means for determining, at each said element for which said head indicator is not set, the element currently identified by said second pointer of such element and for substituting said second pointer of said currently identified element for said second pointer of said determining element;

l) means for incrementing by one said counter value;

m) means responsive to the second determining means for incrementing by one said sequential position value of said tail element, the last recited incremented value being the number of said elements in said string and denoting the length of the string; and n) means for utilizing the length of string value to manipulate data in said processors to effect said arithmetic and logic functions.

10. The apparatus of claim 9 wherein the values of said first and said second pointers each identify the processor in whose memory means the string element identified by said first or said second pointer is stored.

11. The apparatus of claim 9 wherein said elements of said string are aligned in the respective memory means of said processors such that information comprising each said element is stored at the same address locations.

12. The apparatus of claim 9 wherein a true head pointer identifying said true head element is provided at the data structure of said true head element, and said distributed processing system further comprises:

means for copying at each said receiving element, from the passing element, said true head pointer; and means responsive to the incrementing means for transferring said last recited incremented value from said tail element to said true head element.

13. A method of operating a distributing processing system to determine a length of a string of data elements, said processing system comprising a plurality of processors intercoupled to communicate with one another, each said processor comprising processing means for performing arithmetic and logic functions and memory means for storing information, said processing system being responsive to a single sequence of instructions applied in parallel to all of said processors for simultaneously processing in parallel in different ones of said processors said data elements, said method comprising the steps of:

a) assigning each said element a first pointer identifying an immediately succeeding element in said string which is closer to a true head element of the string;

b) storing each said element of said string in the memory means of a different one of said processors;

c) operating the processors to identify a tail element of said string;

d) copying said first pointer of each element into a second pointer of each said element;

e) assigning at said true head element a value of zero to a sequential position indicator;

f) setting a head indicator at said true head element;

g) initializing a counter value at a value of zero;

h) determining if said head indicator is set at each said element in said string and, if so, proceeding to step n) and, if not, proceeding to step i);

i) assigning a value of $2^i + v$ as the sequential position value of each said element for which said head indicator is not set, each of the last recited elements being a receiving element, where:

i = a current counter value; and v = a sequential position value of a passing element identified by said second pointer of said receiving element;

j) copying at each said receiving element the head indicator of said passing element;

k) substituting as a new value of said second pointer at each said receiving element the value of said second pointer of said passing element;

l) incrementing by one said counter value;

m) repeating steps h) through l) until all head indicators are set;

n) incrementing by one said sequential position value of said tail element, the last recited incremented value being the number of elements in said string and denoting the length of the string; and o) using the incremented value denoting the length of the string to manipulate data in the distributed processing system and perform the arithmetic and logic functions.

* * * * *